(12) United States Patent
Fan

(10) Patent No.: US 7,044,249 B2
(45) Date of Patent: May 16, 2006

(54) CONNECTING STRUCTURE OF FRONT AND REAR FRAME PARTS OF A CART FOR PEOPLE TO RIDE ON

(76) Inventor: Ju-Yu Fan, 2F, No. 16, Lane 27, Shui Yuan Road, Chung Cheng District, Taipei (TW)

( * ) Notice: Subject to any disclaimer, the term of this patent is extended or adjusted under 35 U.S.C. 154(b) by 317 days.

(21) Appl. No.: 10/747,367

(22) Filed: Dec. 30, 2003

(65) Prior Publication Data
US 2005/0139410 A1    Jun. 30, 2005

(51) Int. Cl.
*B62D 61/08* (2006.01)
(52) U.S. Cl. .................... 180/208; 280/287; 280/278
(58) Field of Classification Search ............ 280/281.1, 280/287, 278, 651, 87.05, 62; 180/208, 210
See application file for complete search history.

(56) References Cited

U.S. PATENT DOCUMENTS

| | | | | |
|---|---|---|---|---|
| 4,392,690 A | * | 7/1983 | Anderson | 301/121 |
| 4,570,739 A | * | 2/1986 | Kramer | 180/216 |
| 4,861,058 A | * | 8/1989 | Cresswell | 280/278 |
| 4,892,166 A | * | 1/1990 | Gaffney | 180/208 |
| 4,909,525 A | * | 3/1990 | Flowers | 280/30 |
| 5,020,624 A | * | 6/1991 | Nesterick et al. | 180/210 |
| 5,036,938 A | * | 8/1991 | Blount et al. | 180/208 |
| 5,074,372 A | * | 12/1991 | Schepis | 180/208 |
| 5,154,251 A | * | 10/1992 | Fought | 180/208 |
| 5,941,327 A | * | 8/1999 | Wu | 180/65.1 |
| 6,170,592 B1 | * | 1/2001 | Wu | 180/208 |
| 6,273,206 B1 | * | 8/2001 | Bussinger | 180/208 |
| 6,336,517 B1 | * | 1/2002 | Cheng | 180/208 |
| 6,439,331 B1 | * | 8/2002 | Fan | 180/208 |
| 6,530,446 B1 | * | 3/2003 | Lin | 180/208 |
| 6,793,248 B1 | * | 9/2004 | Sung | 280/781 |
| 6,896,084 B1 | * | 5/2005 | Lo | 180/208 |

* cited by examiner

*Primary Examiner*—Jeff Restifo
(74) *Attorney, Agent, or Firm*—Rosenberg, Klein & Lee

(57) ABSTRACT

Front and rear parts of a frame of a three-wheeled cart can be joined together with a rearmost transverse rod of the front part being fitted in front trench-formed fitting portions of the rear part, a rear upright rod of the front part being fitted in a fitting portion of the rear part plus with a locking unit on rear part being engaged with an engaging hole of the front part to secure the front part to the rear part; a support rod is pivoted to the rear part; in assembling the frame, the support rod is positioned upright for holding the rear part steady together with two rear wheels such that one can use two hands instead of only one to effectively prevent the front part, only supported with a wheel, from tilting to one lateral side while moving the same to connect the same to the rear part.

3 Claims, 10 Drawing Sheets

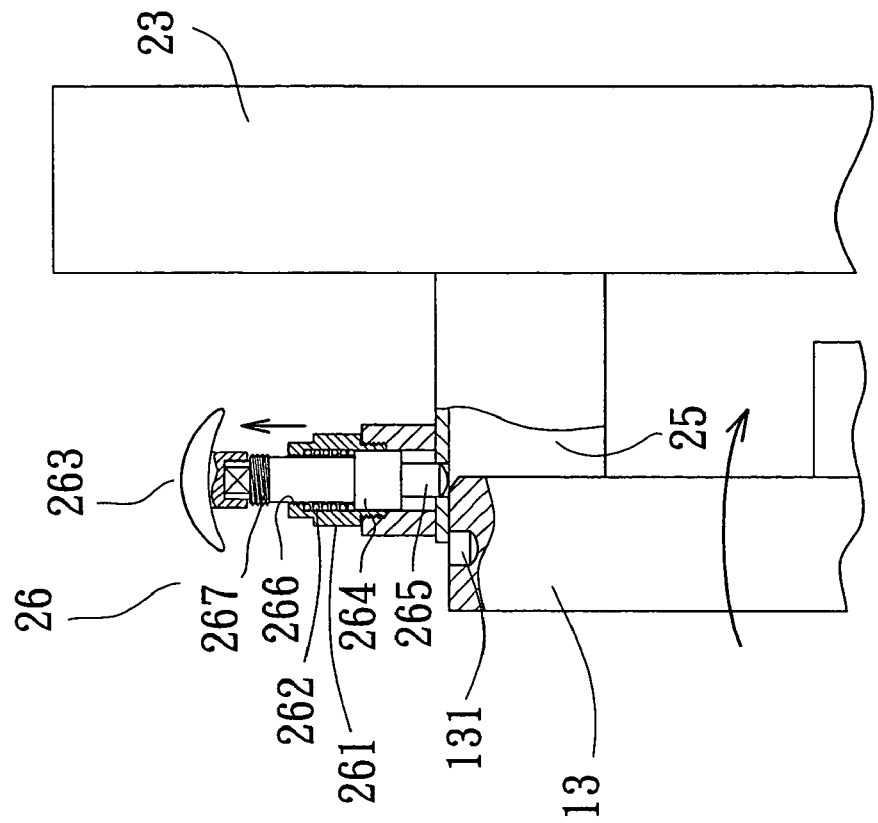
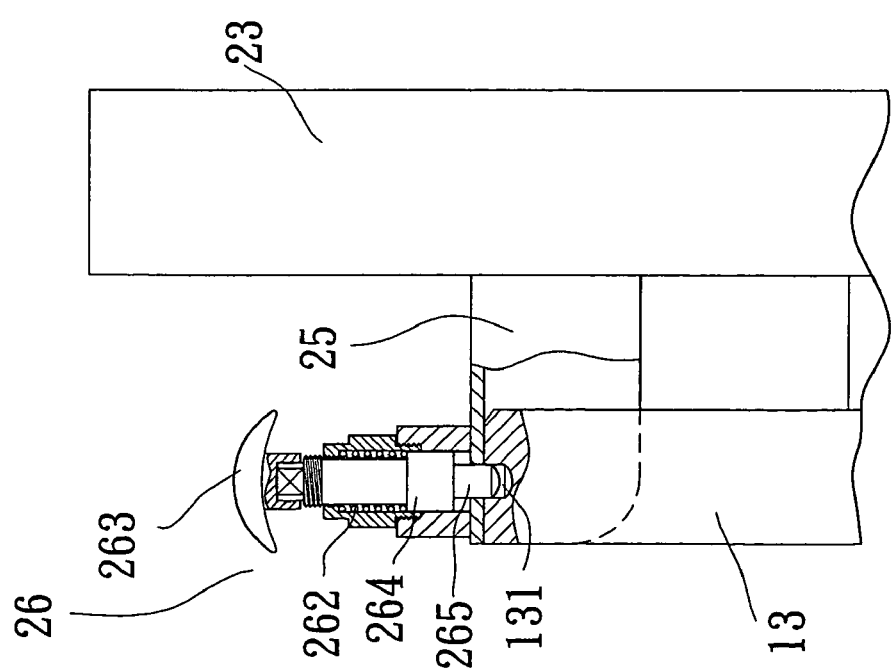

CONNECTING STRUCTURE OF FRONT AND REAR FRAME PARTS OF A CART FOR PEOPLE TO RIDE ON

BACKGROUND OF THE INVENTION

1. Field of the Invention

The present invention relates to a cart for people to ride on, more particularly one whose frame is comprised of front and rear parts, which are separable from each other, and which are formed in such a manner as to be capable of being easily joined together.

2. Brief Description of the Prior Art

Referring to FIG. 9, a conventional cart for people to ride on, especially for a handicapped person, includes front and rear frame parts 5 and 6 separable from each other, a front wheel 51 fitted to the front frame part 5, and two rear wheels 61 fitted to the rear frame part 6. The front frame part 5 has a transverse rod 52 at the rear end, an upright rod 53 at the rear end, and a pair of juxtaposed fitting protrusions 54 on an upper end of the upright rod 53. The fitting protrusions 54 have opposing through holes 541. The rear frame part 6 has a transverse rod 62 at the front end, an upright rod 63 projecting from an upper side of the transverse rod 62, trench-formed fitting portions 64 next to the transverse rod 62, and a fitting bar 65 projecting from a front side of the upright rod 63, which bar 65 has a through hole 651. Thus, the frame parts 5 and 6 can be joined together for use with the transverse rod 52 being held in the trench-formed fitting portions 64, and with the fitting bar 65 being joined to the fitting protrusions 54 by means of a pin 55, which is inserted through the holes 541 and 651, as shown in FIG. 11.

In connecting the frame parts 5 and 6 to each other, referring to FIG. 10, one moves the rear end of the front frame part 5 upwards with one hand, and moves the front end of the rear frame part 6 up with the other hand, and then he fits the transverse rod 52 into the trench-formed fitting portion 64, and positions the fitting bar 65 between the fitting protrusions 54. And, finally he inserting the pin 55 through the holes 541 and 651 while making the hole 651 aligned with the holes 541.

The above cart frame is found to have disadvantages as followings:

1. It is difficult for one to fit the transverse rod 52 into the trench-formed portion 64 and fit the fitting protrusions 54 onto the fitting bar 65 because with only the front wheel 51 being used as the support, the front frame part 5 is prone to tilt towards either one of two lateral sides thereof when the rear end is being moved upwards, as shown in FIG. 10.
2. It is not easy for one to align the holes 541 and 651. And, it is difficult for one to insert the pin 55 through the holes 541 and 651 while he is holding the rear ends of the frame parts 5 and 6 up such that the holes 541 and 651 are aligned.

SUMMARY OF THE INVENTION

It is a main object of the present invention to provide a frame of a cart to overcome the above disadvantages.

The frame includes front and rear parts, which respectively has a front wheel, and two rear wheels fitted thereto. The front and the rear parts are to be joined together with a rearmost transverse rod of the front part being fitted in front trench-formed fitting portions of the rear part, a rear upright rod of the front part being fitted in a fitting portion of the rear part plus with a locking unit on rear part being engaged with an engaging hole of the front part to secure the front part to the rear part. A support rod is pivoted to the rear part. In assembling the frame, the support rod is positioned upright for holding the rear part steady together with the rear wheels such that one can use two hands instead of only one to effectively prevent the front part, only supported with the front wheel, from tilting to one lateral side while moving the same to connect the same to the rear part.

BRIEF DESCRIPTION OF THE DRAWINGS

The present invention will be better understood by referring to the accompanying drawings, wherein:

FIG. 4 is a vertical section of the locking unit of the rear part of the cart frame of the present invention in an unlocking position, FIG. 5 is a vertical section of the locking unit of the rear part of the frame of the present invention in a partially locking position.

DETAILED DESCRIPTION OF THE PREFERRED EMBODIMENTS

Figure 1:
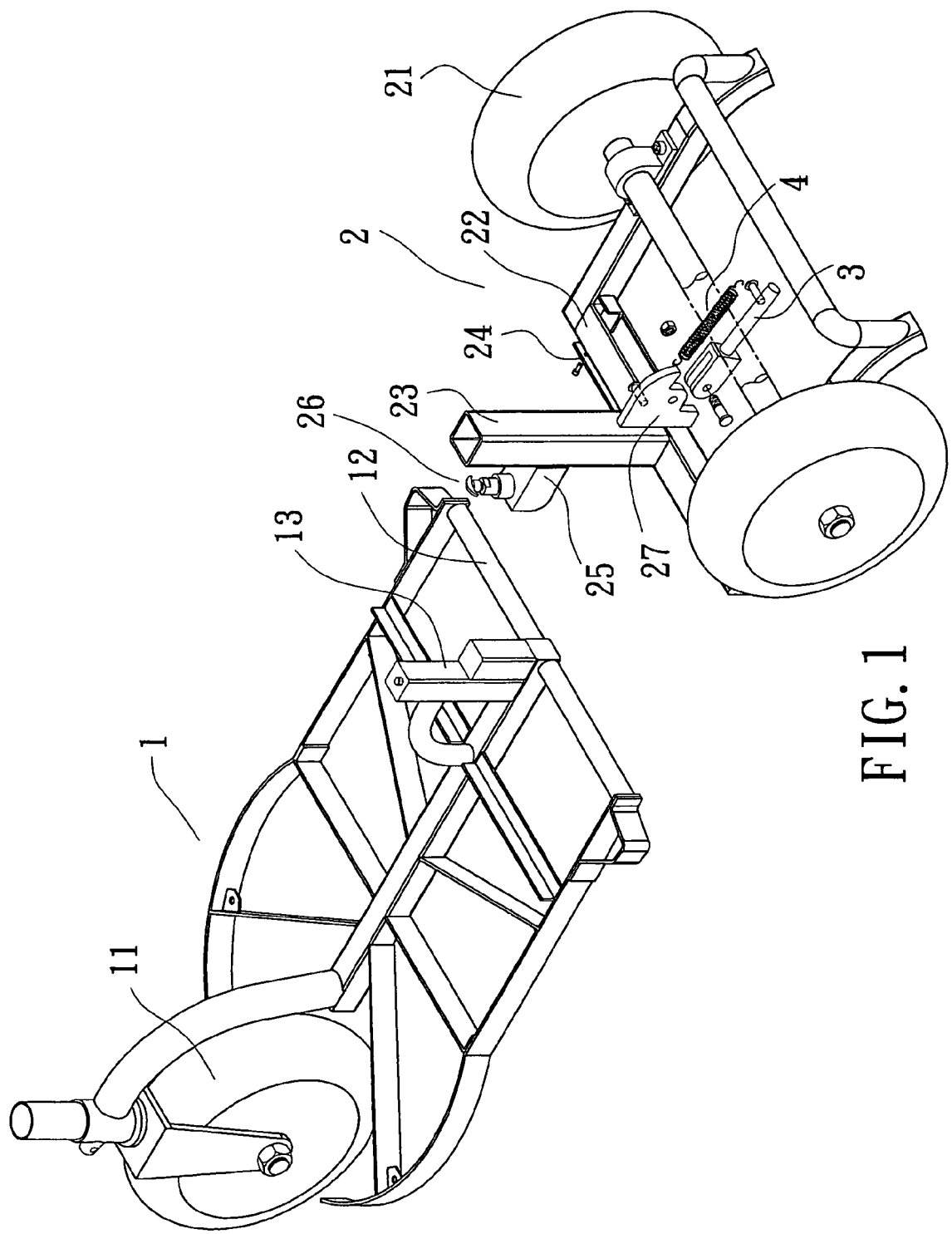
FIG. 1 is an exploded perspective view of the frame of a cart accordingly the present invention.
Figure 2:
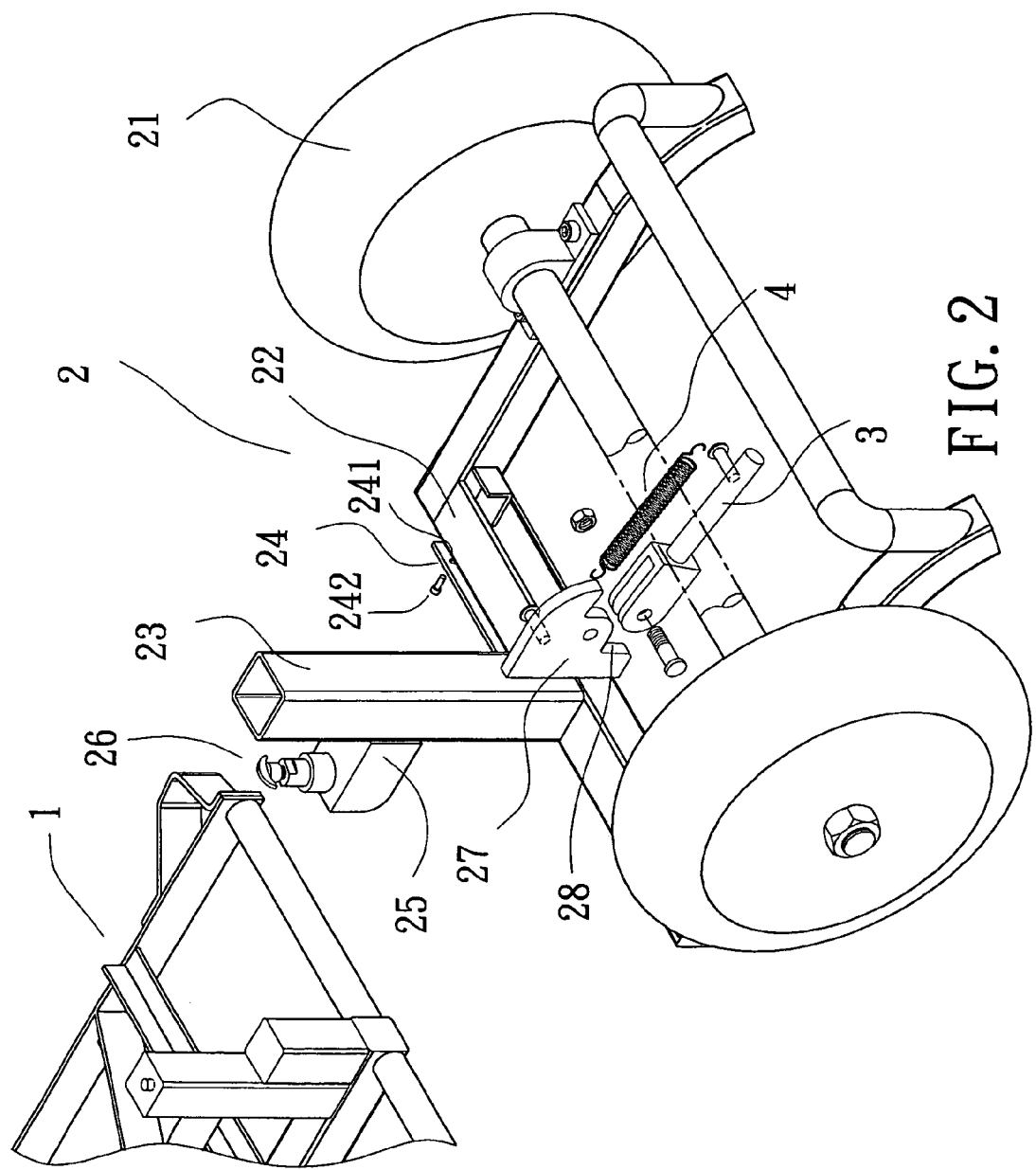
FIG. 2 is a partial exploded perspective view of the rear part of the cart frame according to the present invention.
Figure 3:
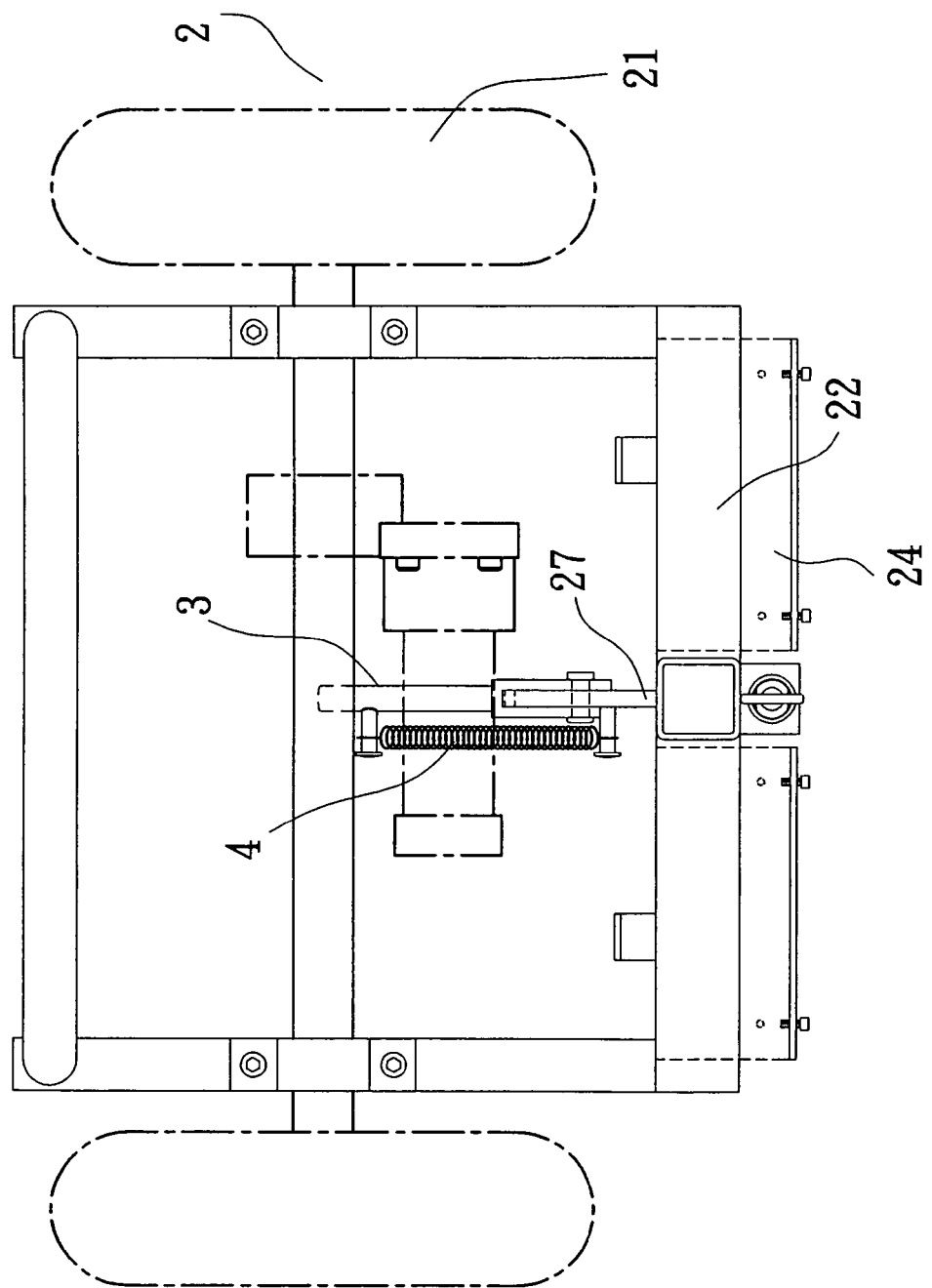
FIG. 3 is a top view of the rear part of the cart frame according to the present invention.

Referring to FIGS. 1 to 3, a preferred embodiment of a frame of a cart for single rider in the present invention includes a front part 1, and a rear part 2 separable from the front part 1. A front wheel 11 is fitted to the front frame part 1, and two rear wheels 21 are fitted to the rear part 2.

The front frame part 1 has a transverse rod 12 at a rear end thereof, and an upright rod 13 projecting upwards from a rear portion thereof, which is formed with an engaging hole 131 on a top.

The rear frame part 2 has a transverse rod 22 at a front end thereof, an upright rod 23 projecting upwards from an upper side of the transverse rod 22, trench-formed fitting portions 24 in front of the transverse rod 22, a fitting portion 25 projecting from a front side of the upright rod 23, a pivotal portion 27, and a locking unit 26 joined to a top of the fitting portion 25. The trench-formed fitting portions 24 have screw holes (not numbered) on front portions, and screw holes 241 on bottom portions thereof. The pivotal portion 27 has a stopping section 28 facing rearwards at a lower end.

Figure 6:
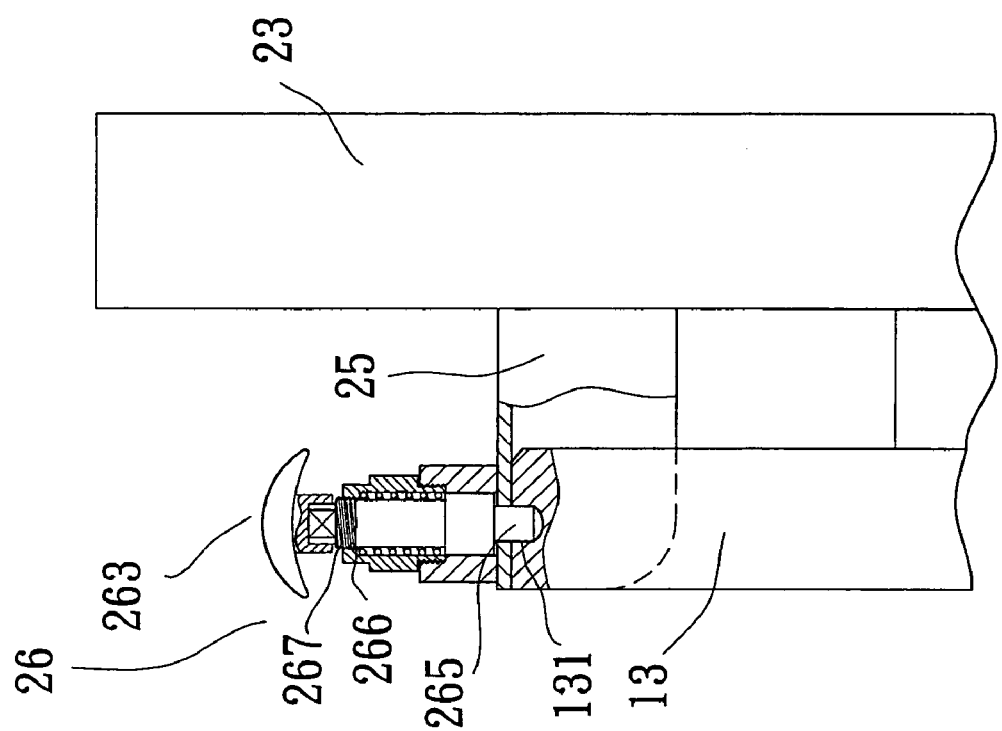
FIG. 6 is a vertical section of the locking unit of the rear part of the present cart frame in the completely locking position.

Referring to FIGS. 4 to 6, the locking unit 26 includes a sleeve 261 secured on the top of the fitting portion 25, an engaging rod 263 passed through the sleeve 261, and a spring 262 positioned around the engaging rod 263 for biasing the engaging rod 263 downwards. An upper end of engaging rod 263 projects up from an upper opening of the sleeve 261 such that one can move the engaging rod 263 upwards to an unlocking position. The engaging rod 263 has a lower end 265, and an annular protrusion 264 near to the lower end 265. The spring 262 is positioned on an upper side of the annular protrusion 264, and can't fall out of the sleeve 261 from the upper opening of the same. The sleeve 261 has screw threads 266 on an inner side of the upper end thereof while the engaging rod 263 has screw threads 267 on an outer side of an upper portion thereof. Owing to the spring 262, the lower end 265 of the engaging rod 263 partially projects downwards from the fitting portion 25 with the screw threads 267 being adjacent to the screw threads 266, as shown in FIG. 5.

In addition, the rear frame part 2 has a support rod 3, which is pivoted to the pivotal portion 27, and which can be moved to a substantially upright position for holding the rear frame part 2 steady on the ground together with the rear wheels 21, in which position the support rod 3 touches the stopping section 28 of the pivotal portion 27. A spring 4 is connected with the pivotal portion 27 and the support rod 3 at two ends thereof so as to bias the support rod 3 to a substantially laid-down no-in-use position.

Figure 7:
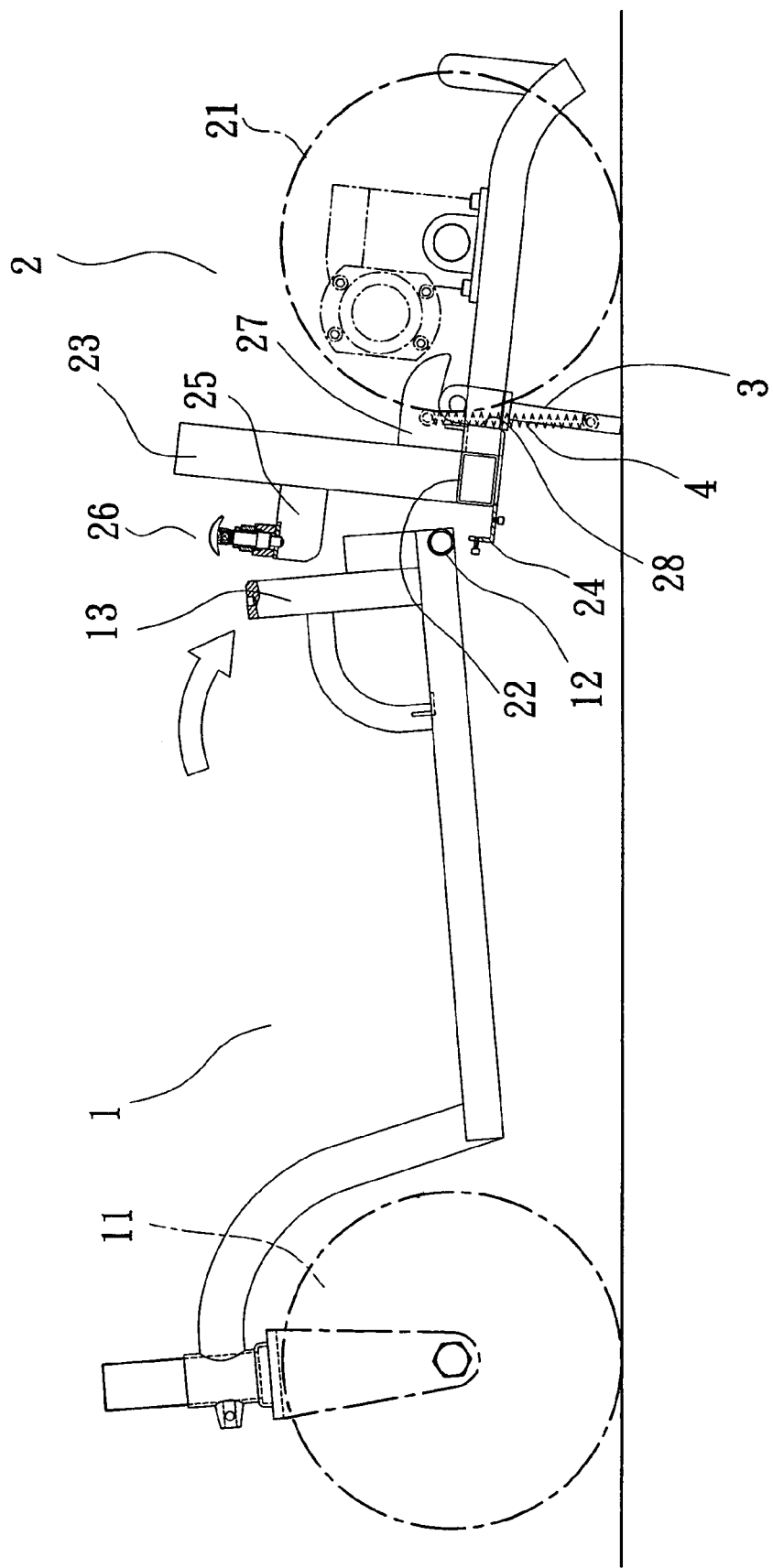
FIG. 7 is a view of the frame of the present invention in assembly.
Figure 8:
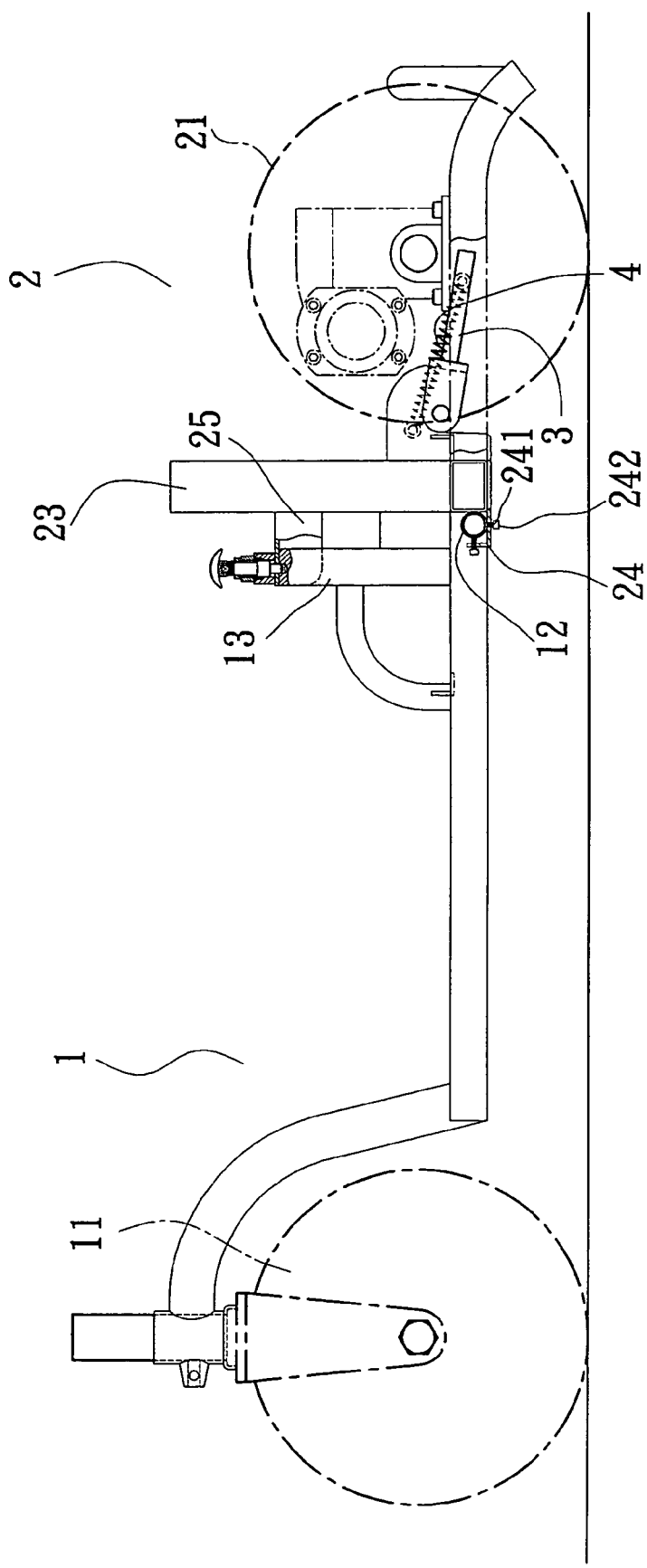
FIG. 8 is a side view of the present cart frame.
Figure 9:
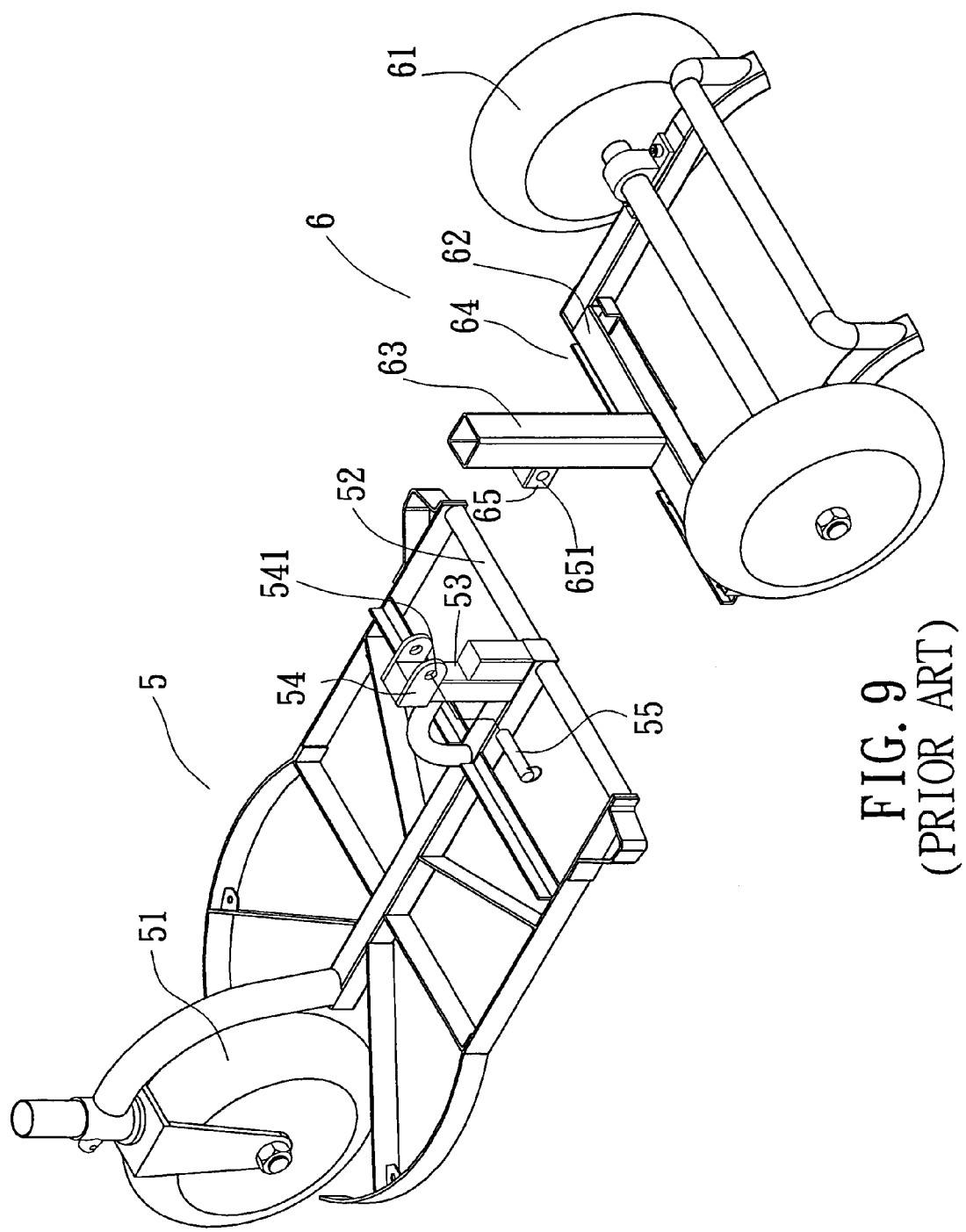
FIG. 9 is an exploded perspective view of the conventional cart frame as described in the Background.
Figure 10:
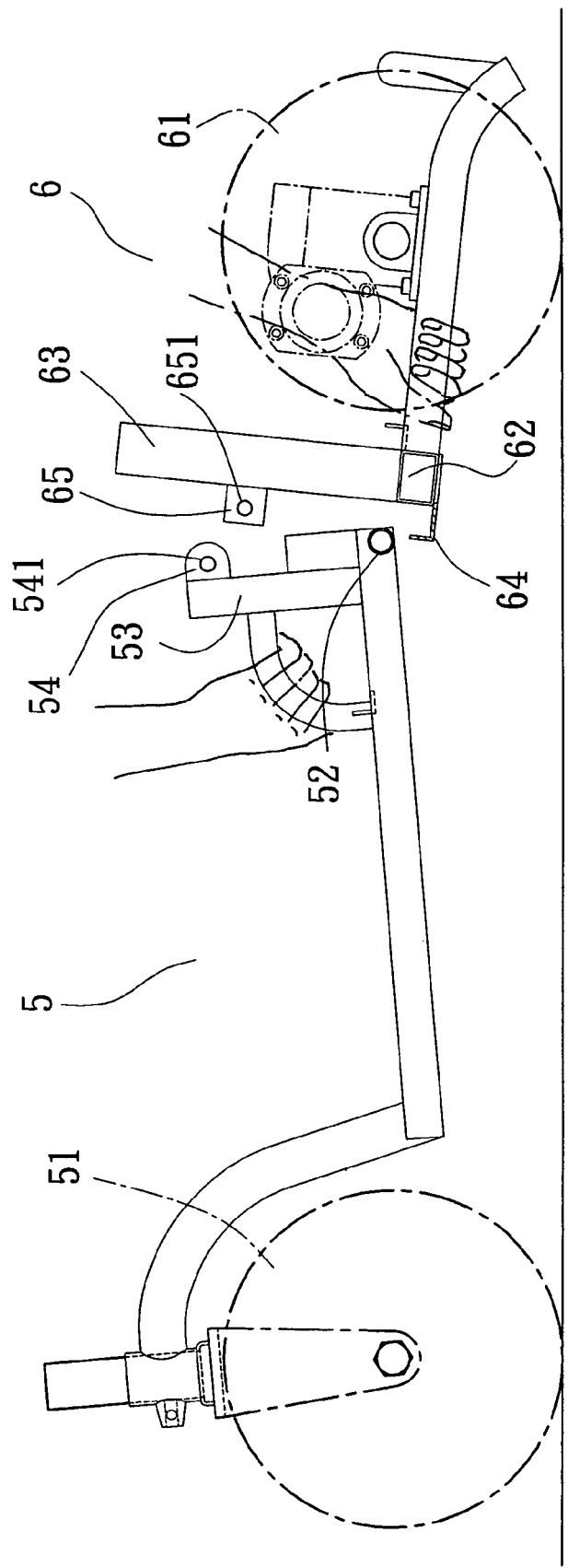
FIG. 10 is a view of the conventional cart frame in assembly.
Figure 11:
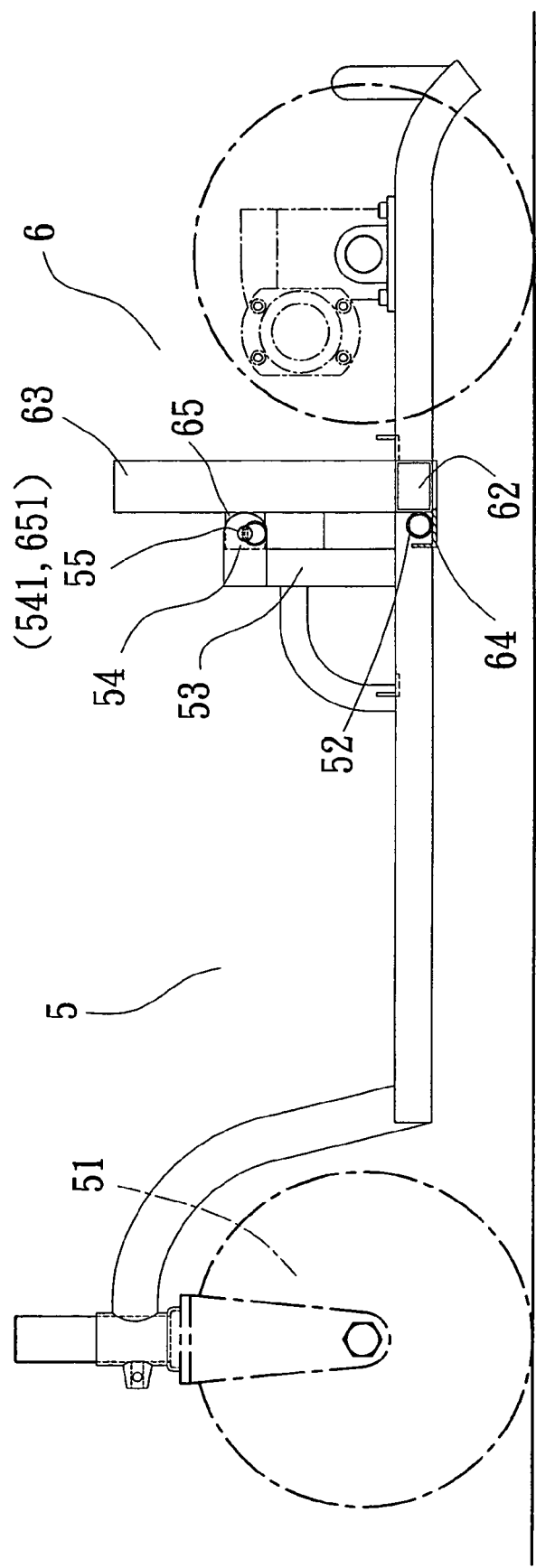
FIG. 11 is a side view of the conventional cart frame.

The method for connecting the front part 1 to the rear part 2 of the frame includes the steps of (1) moving the supporting rod 3 to the substantially upright position to make the rear part 2 held steady by means of the support rod 3 and the rear wheels 21 such that the front end of the rear part 2 is slightly higher than the rear end of the same as shown in FIG. 7, (2) moving the front part 1 such that the rear end of the same is slightly higher than the front end of the same while holding the front and the rear portions of the front part 1 with two hands to prevent the front part 1 from tilting to either one of the lateral sides, and fitting the transverse rod 12 into the trench-formed fitting portion 24, (3) making the upright rod 13 tilt towards the front side of the upright rod 23 (FIG. 4) such that the upright rod 23 tilts towards the upright rod 13 at the same time, and the upper end of the upright rod 13 is fitted in the fitting portion 25 for allowing the lower end 265 of the engaging rod 263 of the locking unit 26 to snap into the engaging hole 131 of the front frame part 1 to lock the front part 1 to the rear part 2 as shown in FIG. 5, (4) turn the engaging rod 263 so as to make the screw threads 267 of the same connected with the screw threads 266 of the sleeve 261 such that the engaging rod 263 can't be accidentally moved away from the locking position, as shown in FIG. 6, and (5) screwing bolts 242 through the holes 241 of the trench-formed fitting portions 24 to prop the transverse rod 12 up at a proper height, and screwing bolts (not numbered) through the holes of the front portion of the fitting portions 24 so that the bolts are tightly pressed against the transverse rod 13 to make the same firmly held in the trench-formed fitting portions 24; the support rod 27 will pivot slightly rearwards, and then will be biased to the substantially laid-down not-in-use position by the spring 4 while the upright rod 23 is tilting towards the upright rod 13 in the third step. After the engaging rod 263 is turned so as to make the screw threads 267 connected with the screw threads 266 in the fourth step, the lower end 265 of the engaging rod 263 will completely engage the engaging hole 131 on the upper end of the upright rod 13.

From the above description, it can be easily understood that the cart frame of the present invention has advantages as followings:

1. With the help of the rear wheels 21 and the support rod 3, the rear part 2 of the frame can be held steady on the ground even if one doesn't hold the rear part 2 with the hands. Therefore, one can use two hands to instead of only one to effectively prevent the front part 1, only supported on the front wheel, from tilting to one lateral side while moving the same to connect the same to the rear part. Consequently, the front and the rear parts can be easily joined.

2. The engaging rod 263 of the locking unit 26 will snap into the engaging hole 131 of the front part 1 automatically during the course of the upright rod 13 of the front part 1 is fitted to the fitting portion 25 of the rear part 2. Therefore, it won't take much labor or time to assemble the frame.

What is claimed is:

1. A connecting structure of front and rear parts of a frame of a cart, comprising
   a first transverse rod at a rear end of a front frame part, which has one front wheel fitted thereto;
   a first upright rod projecting upwards from a rear portion of the front frame part; the upright rod having an engaging hole on a top;
   a second transverse rod at a front end of a rear frame part, which has two rear wheels fitted thereto;
   a second upright rod projecting upwards from a front portion of the rear frame part;
   a plurality of trench-formed fitting portions formed in front of the second transverse rod of the rear frame part;
   a pivotal portion fixed on the rear frame part; the pivotal portion having a stopping section facing rearwards at a lower end thereof;
   a support rod pivoted to the pivotal portion; the support rod being capable of being moved to a substantially upright position where it touches the rearwards-facing stopping section of the pivotal portion; the rear frame part being capable of being held steady with the front end thereof being slightly higher than a rear end with help of the rear wheels and the support rod when the support rod is in the substantially upright position;
   a spring joined to the support rod and the pivotal portion at two ends thereof for biasing the support rod to a substantially laid-down position;
   a second fitting portion projecting from a front side of the second upright rod; and
   a locking unit disposed on a top of the second fitting portion; the locking unit including:
   (1) a sleeve secured on the top of the second fitting portion;
   (2) an engaging rod passed through the sleeve with an upper end thereof projecting up from an upper opening of the sleeve; the engaging rod having a lower end, and an annular protrusion near to the lower end;
   (3) a spring positioned on an upper side of the annular protrusion of the engaging rod for biasing the engaging rod downwards such that the lower end of the engaging rod projects down from the second fitting portion;
   thus allowing the front and the rear frame parts to be joined together with the first transverse rod being fitted in the trench-formed fitting portions, the upper end of the first upright rod being fitted in the second fitting portion of the rear frame part plus with the engaging rod of the locking unit being inserted in the engaging hole on the front frame part.

2. The connecting structure of front and rear parts of a frame of a cart as claimed in claim 1, wherein the engaging rod has screw threads on an outer side of an upper portion, and the sleeve has screw threads on an inner side of an upper end for connection with the screw threads of the engaging rod.

3. The connecting structure of front and rear parts of a frame of a cart as claimed in claim 1, wherein the trench-formed fitting portions are formed with screw holes on front portions and bottom portions thereof while bolts are screwed through the screw holes, and pressed against the transverse rod of the front frame part.

* * * * *